March 1, 1966  C. D. MACY ET AL  3,237,664
APPARATUS FOR AND METHOD OF TRIMMING FAT FROM HAMS AND THE LIKE
Filed March 17, 1964  7 Sheets-Sheet 1
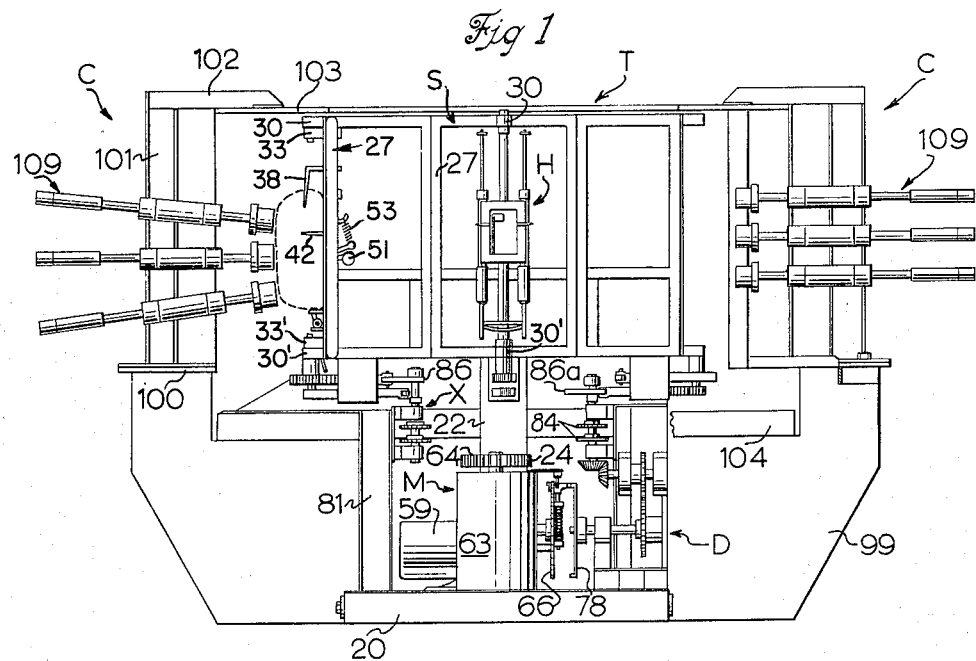
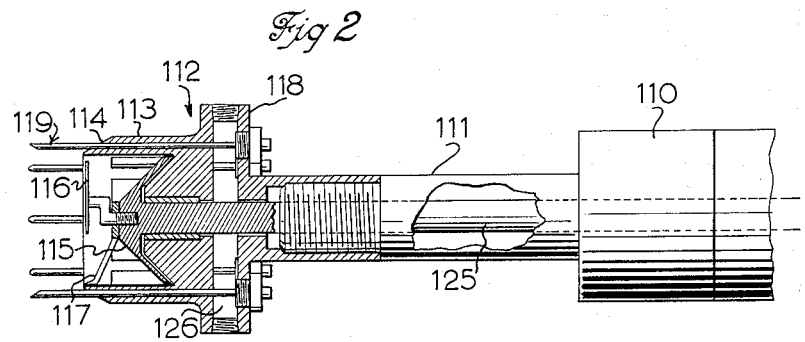
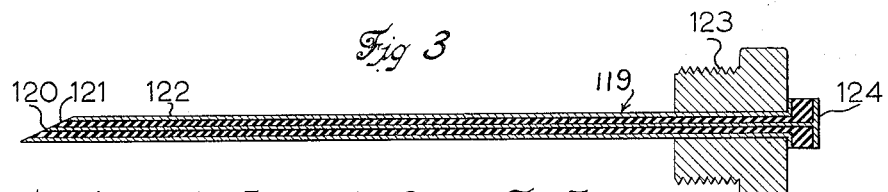
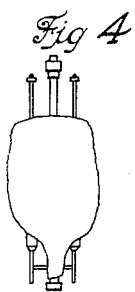
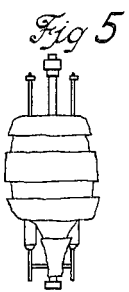
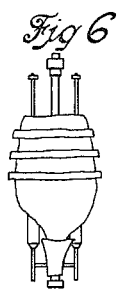
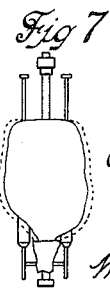
Inventors
Oscar H. Lindstrom
Christian D. Macy
By Their Attorneys
Williamson, Schroeder & Palmatier

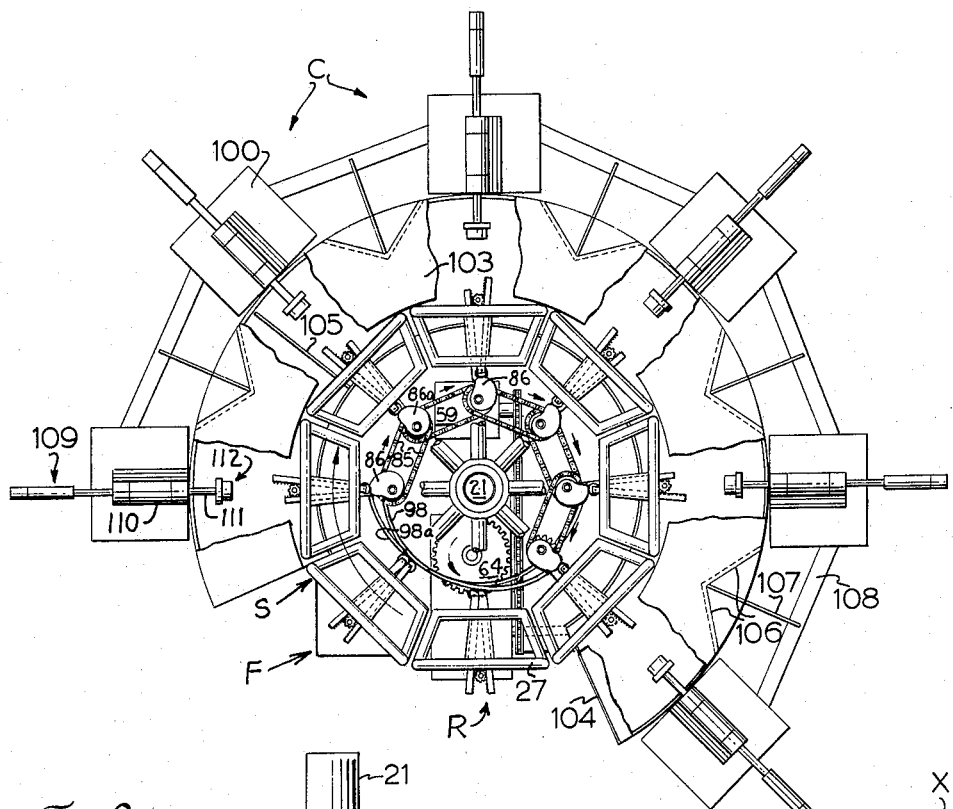
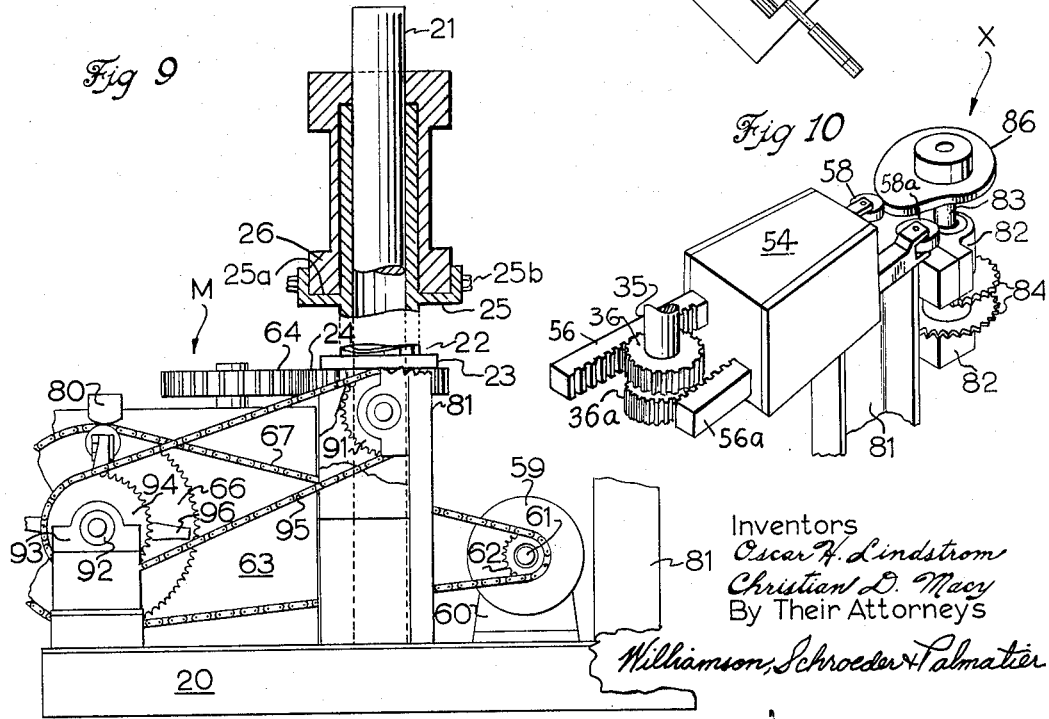

March 1, 1966 C. D. MACY ET AL 3,237,664
APPARATUS FOR AND METHOD OF TRIMMING FAT FROM HAMS AND THE LIKE
Filed March 17, 1964 7 Sheets-Sheet 5
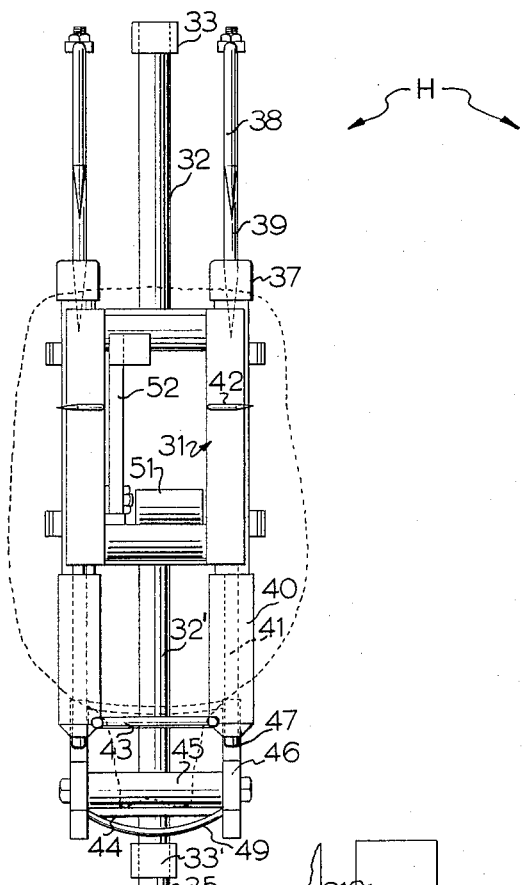
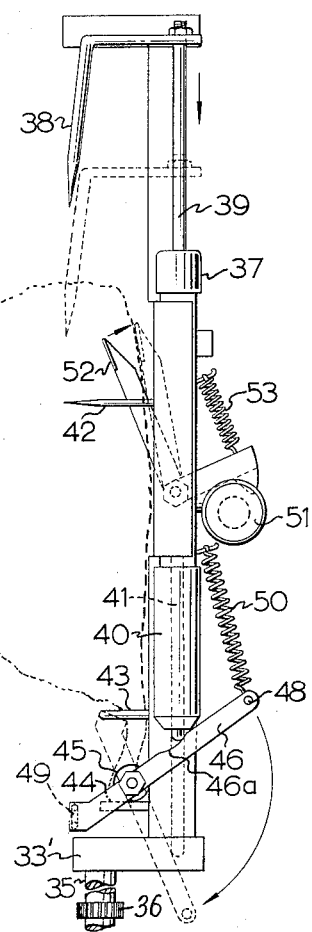
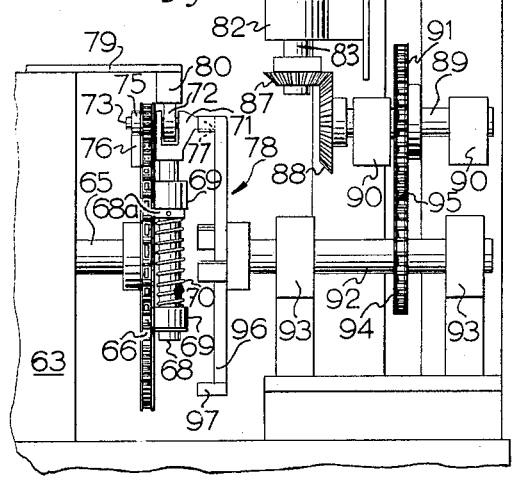
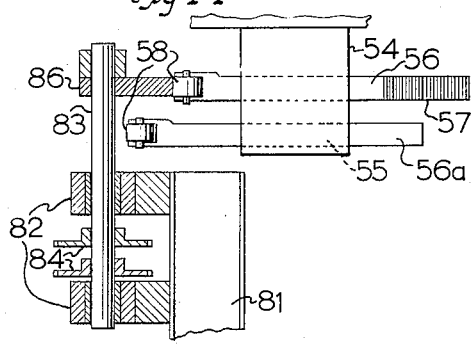
Inventors
Oscar H. Lindstrom
Christian D. Macy
By Their Attorneys
Williamson, Schroeder & Palmatier

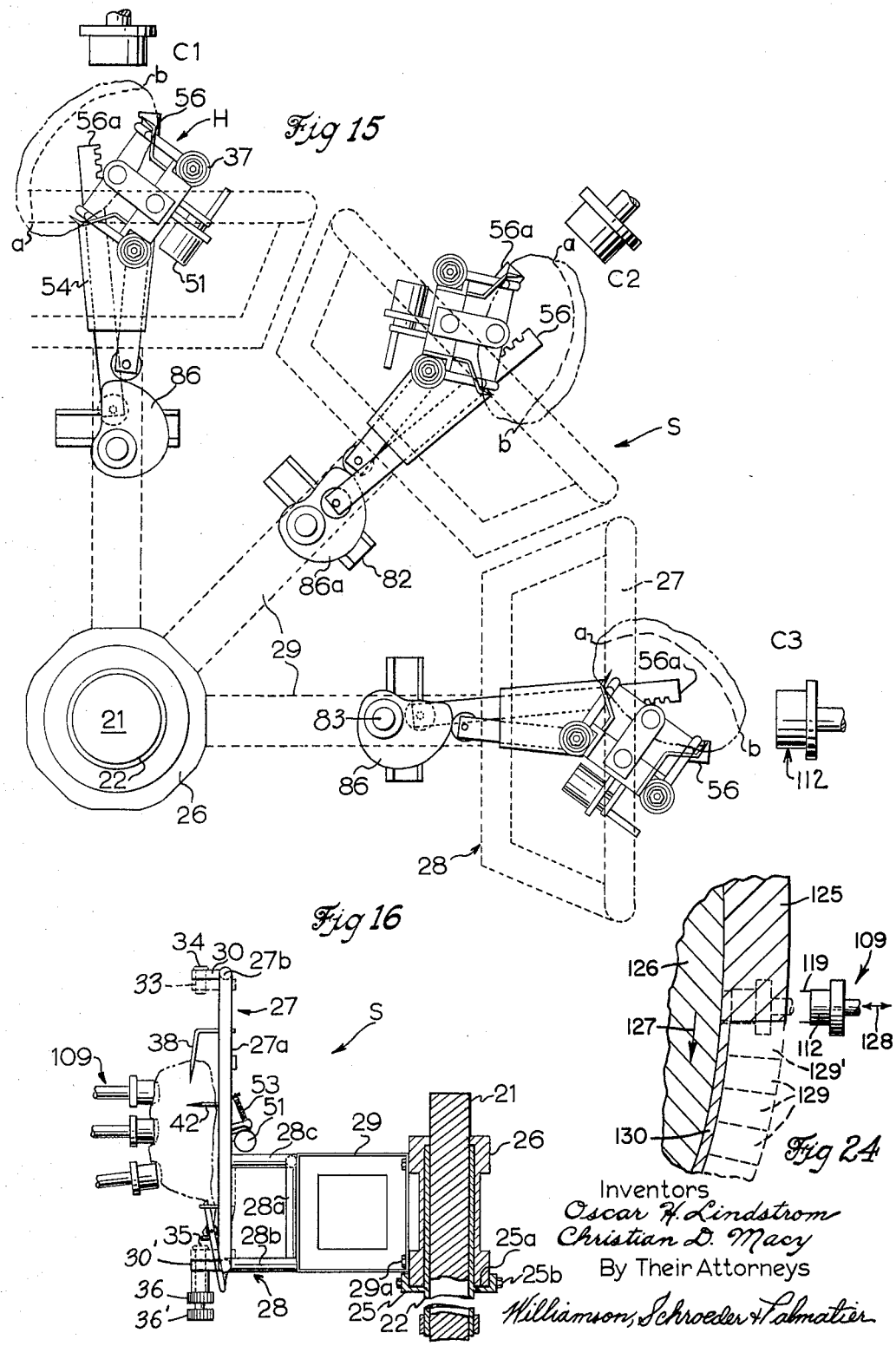

March 1, 1966  C. D. MACY ET AL  3,237,664
APPARATUS FOR AND METHOD OF TRIMMING FAT FROM HAMS AND THE LIKE
Filed March 17, 1964  7 Sheets-Sheet 5

Inventors
Oscar H. Lindstrom
Christian D. Macy
By Their Attorneys
Williamson, Schroeder & Palmatier March 1, 1966  C. D. MACY ET AL  3,237,664
APPARATUS FOR AND METHOD OF TRIMMING FAT FROM HAMS AND THE LIKE
Filed March 17, 1964  7 Sheets-Sheet 6

INVENTORS
OSCAR H. LINDSTROM,
CHRISTIAN D. MACY, DECEASED
BY LAURA G. MACY, ADMINISTRATRIX

BY Williamson & Palmatier
ATTORNEYS

March 1, 1966   C. D. MACY ET AL   3,237,664
APPARATUS FOR AND METHOD OF TRIMMING FAT FROM HAMS AND THE LIKE
Filed March 17, 1964   7 Sheets-Sheet 7

INVENTORS
OSCAR H. LINDSTROM,
CHRISTIAN D. MACY, Deceased
BY LAURA G. MACY, Administratrix
BY
Williamson & Palmatier
ATTORNEYS 3,237,664
APPARATUS FOR AND METHOD OF TRIMMING FAT FROM HAMS AND THE LIKE Christian D. Macy, deceased, late of Austin, Minn., by Laura G. Macy, special administratrix, Austin, Minn., and Oscar H. Lindstrom, Austin, Minn., assignors to Geo. A. Hormel & Company, Austin, Minn., a corporation of Delaware Filed Mar. 17, 1964, Ser. No. 354,201
54 Claims. (Cl. 146—241)

This is a continuation-in-part of application Serial No. 845,014, filed October 7, 1959, now abandoned.

This invention relates to apparatus and methods for removing excess fat from cuts of meats, particularly hams and the like.

In the meat packing and processing industry, one of the most important operations which must be conducted is that of trimming certain cuts of meats to remove the excess waste therefrom and place the same in suitable condition for distribution to the consumer. One of the major areas in which this trimming operation is employed is in the removal of excess fat from hams. According to many methods and apparatus presently available, the hams must be trimmed in large part by manual operation and/or handled individually which results in a laborious and time consuming operation. No apparatus or method has yet been devised and made available which is capable of trimming the fat from hams successively and continuously to enable large numbers of hams to be accurately trimmed in a short space of time. In addition, according to present apparatus and methods available for trimming the fat from said hams, there has been to date no satisfactory means developed of gauging the amount of removal of said fat or controlling the depth of cut to a predetermined extent so as to produce a trimmed ham having a substantially uniform layer of fat covering the lean meat which is the most desirable condition for a processed ham.

Therefore, an important object of our invention is novel meat trimming apparatus of the class described in which the fat is removed from the meat in automatic fashion with substantially no effort required on the part of the operator.

Still another object is fat removing apparatus which automatically removes substantially all excess fat from the entire periphery of the fatty layer of the ham while permitting a substantially uniform layer of fat of predetermined thickness to remain.

Still another object is fat removing or trimming apparatus of the class described which continuously and automatically removes the fat from a succession or series of hams moving along a predetermined course, the fat being removed to a uniform predetermined depth throughout the fatty portion of the ham more quickly and with less effort than with methods and apparatus presently available to materially reduce the time, effort and costs of labor required to successfully trim the fat from hams to the extent and in the manner most desirable.

Still another object is fat removing apparatus of the class described in which a plurality of hams may be successively and continuously processed for removal of fat therefrom with no effort required on the part of the operator except to mount and demount the hams on the apparatus.

A further object is fat removing apparatus of the class described in which a plurality of hams are mounted on a turntable whereby they are successively delivered to a series of processing or fat removing stations where successive and adjacent layers or strips of fat are removed to a predetermined depth at each station, the hams being completely trimed to the desired amount of residual fat upon leaving the last of said stations.

Another object is apparatus of the class described in which the fat removing mechanism is provided with sensing means for controlling the depth of cut to limit the same to a predetermined amount.

Still another object is apparatus of the class described in which the hams are individually rotated about their own axis at each of the fat removing stations to permit the cutters to remove peripheral strips of fat therefrom.

Still another object is apparatus of the class described which provides convenient means for disposing of the fat removed from said hams.

Another more specific object is to provide fat removing apparatus of the class described in which the hams are individually rotated relative to cutters which reciprocate at relatively high speeds in a direction generally normal to the fatty surface of the ham so as to cut away a series of small overlapping segments of fat providing a continuous groove across the face of the fatty portion, the cutters being provided with sensing means for controlling the depth of cut during each cutting cycle relative to the surface of the lean meat underlying said fat whereby the forward movement of the cutters terminates the same distance from the lean during each cycle of movement to provide a layer of fat of substantially uniform thickness on the trimmed ham.

Another object is to provide a novel method of trimming fat from hams and the like to produce a trimmed product having a substantially uniform layer of fat of predetermined thickness remaining thereon wherein the movement of the fat removal means relative to the border between the fat and the lean meat underlying same is controlled by means capable of recording said border.

Another object is to provide a novel method of trimming fat from hams and the like wherein the depth of penetration of the fat removal means is controlled by sensing means capable of recording the border between the fat and the lean meat underlying same while the lean meat is overlain with fat.

Another object is to provide a novel method of trimming fat from hams and the like wherein the fat removal means is moved through the fat towards the underlying lean meat, and wherein the movement of the fat removal means towards the lean meat is terminated at some predetermined distance relative thereto in response to means capable of recording said border before the removal means reaches same.

These and other objects and advantages of our invention will more fully appear from the following description made in connection with the accompanying drawings wherein like reference characters refer to the same or similar parts, and in which:

FIG. 1 is a side elevational view of the assembled apparatus of our invention with portions thereof removed for clarity;

FIG. 2 is a side elevational view on an enlarged scale and in partial section of the cutting mechanism;

FIG. 3 is a longitudinal section on an enlarged scale of a preferred form of probe employed with the cutting mechanism of our invention;

Figure 18:
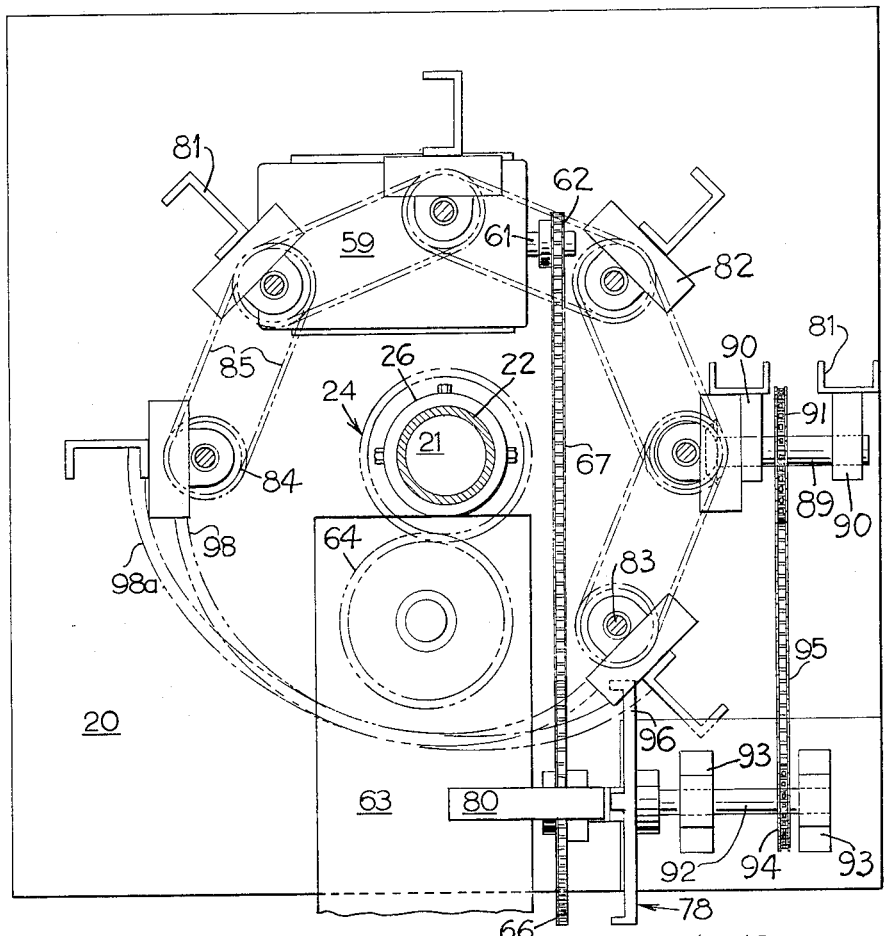
Figure 17:
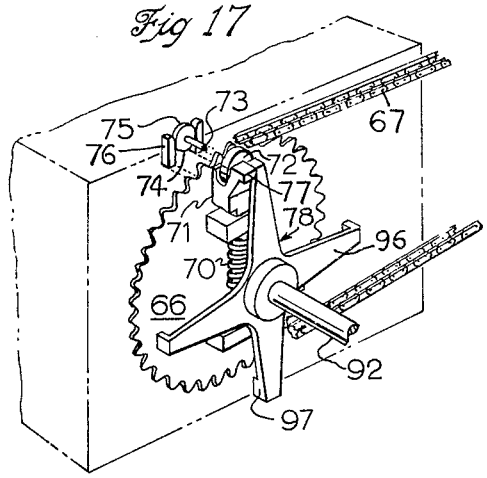
Figure 19:
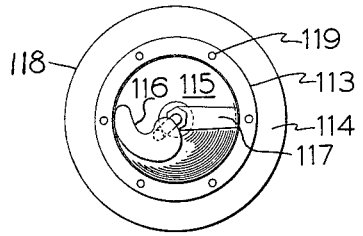
Figure 20:
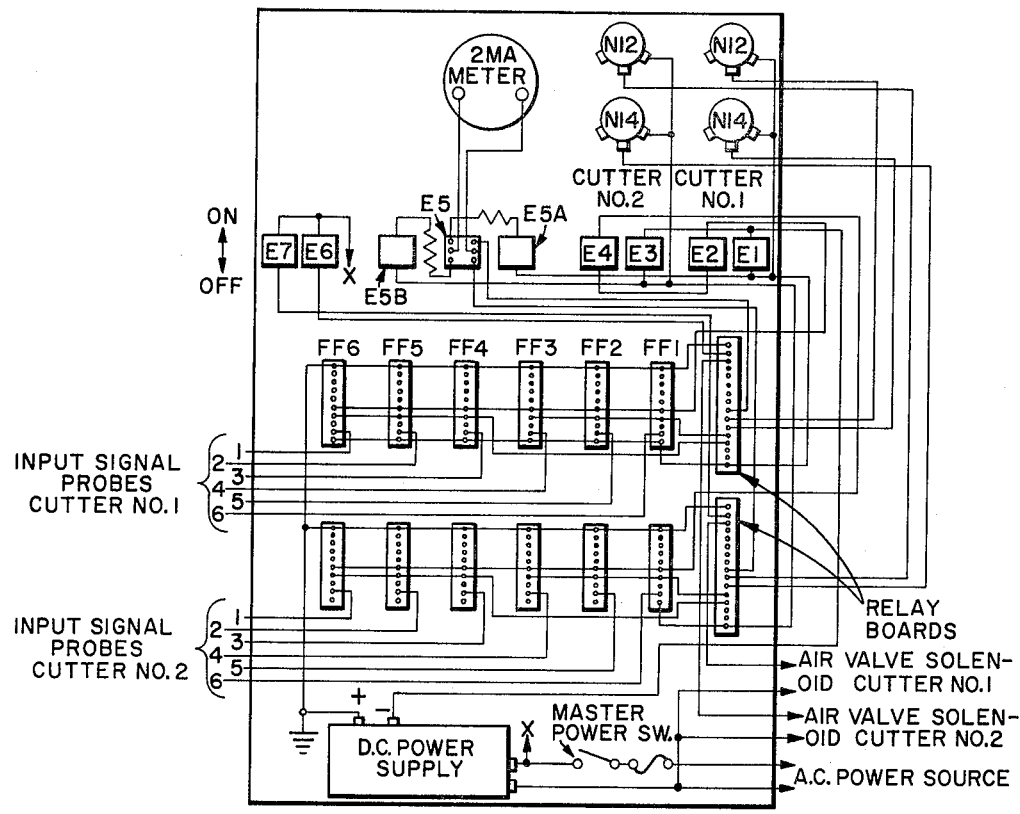
Figure 22:
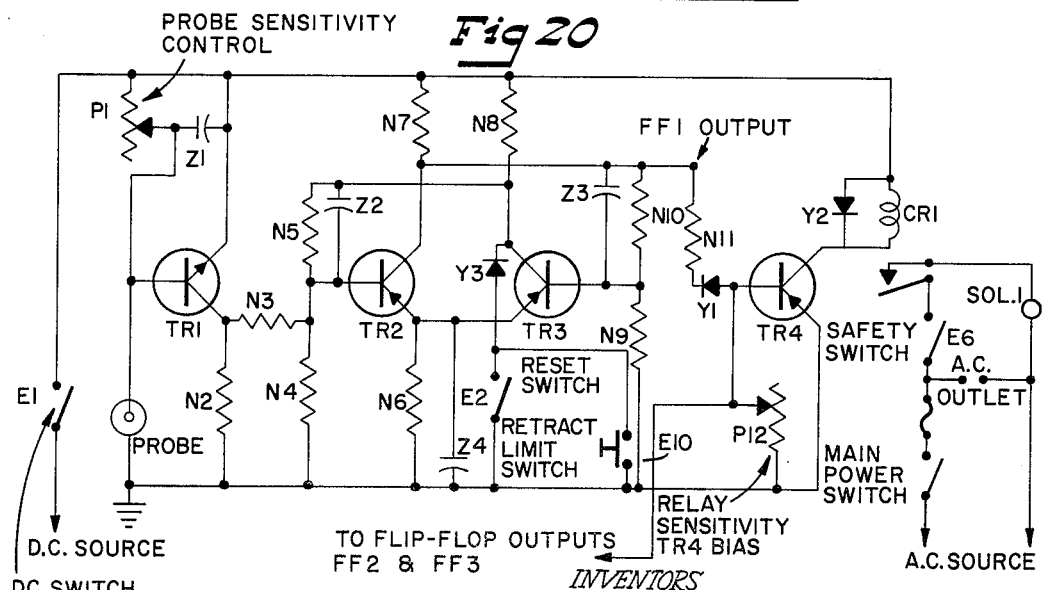
Figure 21:
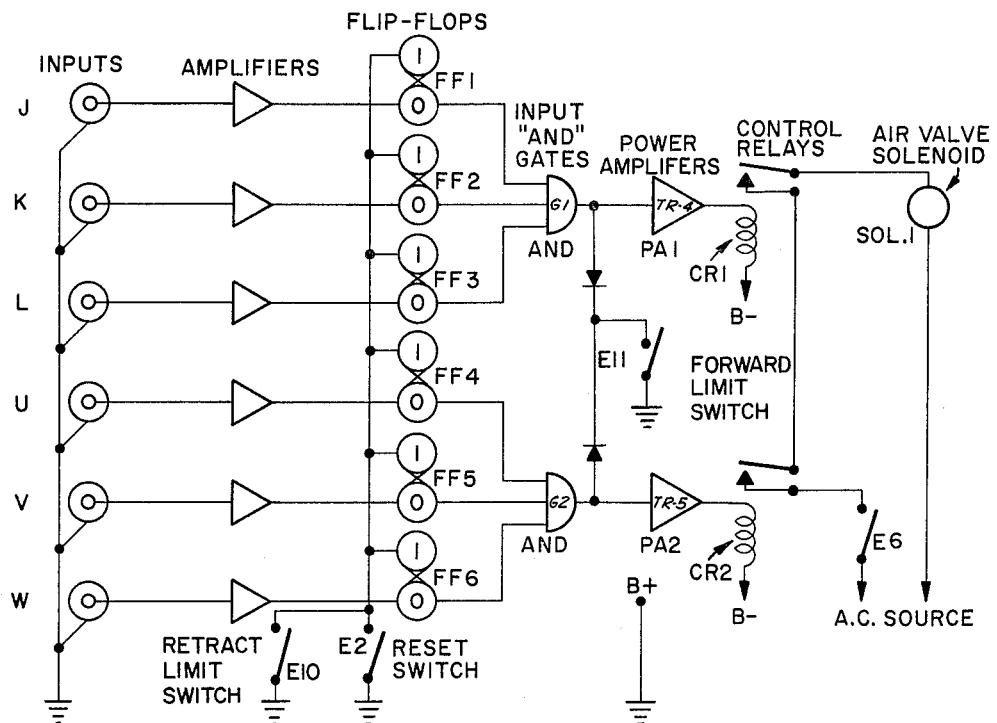
Figure 23:
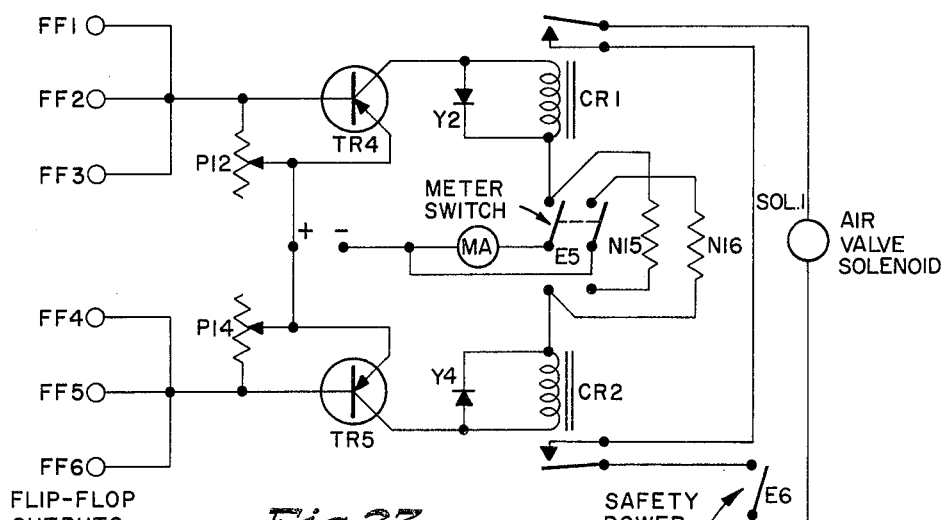

FIGS. 4 to 7 inclusive diagrammatically illustrate the appearance of a ham at various stages of the fat trimming operation;

FIG. 8 is a top plan view of the assembly of FIG. 1 with portions broken away and the ham holder removed for clarity;

FIG. 9 is a side elevational detail view on an enlarged scale of a portion of the drive mechanism as viewed from the right side of FIG. 1 with parts thereof shown in section;

FIG. 10 is a perspective detail view of one of the ham rotating mechanisms;

FIG. 11 is a front elevational detail view on an enlarged scale of the ham holding unit;

FIG. 12 is a side elevational view of the ham holding unit of FIG. 11;

FIG. 13 is an elevational view on an enlarged scale of a portion of the drive mechanism for rotating the hams;

FIG. 14 is a side view in vertical section of the ham rotating mechanism of FIG. 10;

FIG. 15 is a somewhat diagrammatic top plan view illustrating the positions of the hams and their holders at the end of their travel at successive trimming stations;

FIG. 16 is a side elevational view on an enlarged scale of one of the ham mounting stations;

FIG. 17 is a perspective detail view on an enlarged scale of the portion of the drive mechanism for the ham rotating system;

FIG. 18 is a top plan view of the assembly of FIG. 1 on an enlarged scale, with the turret and cutting stations removed;

FIG. 19 is an end elevational view of the cutting mechanism of FIG. 2;

FIG. 20 is a schematic diagram of a cutter control unit for each cutting station;

FIG. 21 is a schematic diagram of a transistorized depth controller logic network for the cutters;

FIG. 22 is a schematic diagram of a basic controller circuit;

FIG. 23 is a schematic diagram of a relay control board;

FIG. 24 is a diagrammatic sketch on an enlarged scale showing a cutter in the process of trimming a strip of fat from the surface of a ham.

Reference is now made to the accompanying drawings for a more detailed description of a preferred form of our invention.

Referring particularly to FIGS. 1 and 8, the defatting apparatus of our invention comprises a rotatable turret or turntable unit indicated generally by T, which includes a plurality of radially disposed equi-spaced ham holder mounting stations S which in the form shown are eight in number and rotatable about a common axis, the turntable unit T being driven by a suitable drive mechanism M disposed therebelow. Each of the mounting stations S normally has rotatably mounted thereon a ham holding unit H, each of which is rotated by a suitable drive system D. For clarity of illustration, some of the ham holders H have not been shown in FIG. 1 and none have been shown in FIG. 8. However, it is to be understood that a ham holder H is normally mounted on each of the mounting stations S in the same manner as is illustrated in FIG. 1 and in other views and as described in more detail hereinafter.

The turntable unit T is circumferentially enclosed by a plurality of equi-spaced processing or operational stations, which in the form shown successively includes six ham cutting or trimming stations C, a ham discharge or removal station R, and a ham feeding station F.

Referring particularly to FIG. 9, the turntable unit T comprises a supporting horizontal base 20 having a vertical spindle or shaft 21 fixedly mounted thereon. An elongate drive sleeve 22 is removably and rotatably mounted or journalled on the spindle 21. The lower end of the sleeve 22 is provided with a transverse outwardly extending annular flange 23 which has a spur gear 14 mounted on the lower face thereof. Above the flange 23, the sleeve 22 is provided with a transversely disposed cylindrical member 25 which provides a shallow annular socket or recess 25a. A tubular cylindrical hub member 26 is fitted over and encloses the upper portion of the sleeve 22 in contiguous relationship therewith, the lower end or base of the hub 26 being received by and seated in the socket 25a and removably secured thereto by any suitable fastening means, such as the set screws 25b, so as to be driven by and rotated with the sleeve 22.

Referring particularly to FIG. 16, the hub 26 has radially mounted thereon the aforementioned eight equispaced ham holder mounting assemblies or stations S. The mounting stations S are similar in construction and consist of a vertical rectangular mounting frame 27 including sides 27a and top and bottom members 27b and carried by a supporting frame 28 which includes a vertical center brace 28a, a horizontal lower center brace 28b, and an upper horizontal C-shaped brace 28c, which in turn is mounted on a vertically disposed rectangular mounting bracket 29 which is secured to the hub 26 by any suitable fastening means 29a and which extends radially therefrom. The upper and lower members 27b of the supporting frame 27 have mounted thereon and extending forwardly therefrom ears 30 and 30' respectively which have a pair of vertically aligned apertures which provide bearings for journalling the pivot pins or shafts of the ham holder units hereinafter to be described.

The ham holding units H best seen in FIGS. 11 and 12 are designed to hold a ham in vertical position at each station with the shank end down and consists of a rectangular supporting frame 31 having vertically disposed shafts 32 and 32' extending from the upper and lower portions of the frame 31 respectively, and outer end portions of each of said shafts 32 being provided with transversely and forwardly extending apertured feet 33 and 33' respectively, the aperture of the upper foot 33 being adapted to receive and journal a vertical pivot pin or arbor 34 carried by the upper apertured ear or bearing 30 of the mounting frame 27 (as shown in FIG. 16), the lower foot 33' having a vertical depending drive shaft 35 drivingly connected thereto, said drive shaft 35 being journalled in the lower ear 30' (as shown in FIG. 16) and having a pair of pinions or spur-gears 36 and 36a mounted thereon adjacent the lower end thereof for rotating the holding units and the hams mounted thereon in a manner hereinafter to be described.

A pair of fluid motors 37, preferably pneumatically operated, the controls for which are not shown, are vertically mounted on the supporting frame 31. A pair of ham holding prongs 38 which extend downwardly and are inclined slightly forwardly are mounted on the upper piston rods 39 of the motors 37 and movable therewith. A pair of elongate cylindrical tubular members 40 having beveled lower ends are connected to the motors 37 and serve to guide the lower piston rods 41 of the motors 37 which serve to actuate the shank clamp 49, the rods 41 and prongs 38 being adapted for simultaneous vertical movement in the same direction, either up or down, by operation of the motors 37. Another pair of ham holding prongs 42 are mounted on the frame intermediate the ends thereof and extend forwardly therefrom in horizontal fashion. The lower shaft 32' has mounted thereon a horizontally disposed forwardly extending U-shaped rest member or bracket 43 against which the back side of the shank end of the ham rests or nests against. Intermediate the U-shaped bracket 43 and the lower foot 33 a plate-like rest member 44 is also mounted on the lower end of the shaft 32' and forwardly thereof, said plate 44 providing a resting place for the lower end of the shank of the ham which is to be held in the ham holder. A horizontally disposed elongate cylindrical member 45 rests on the rear upper surface of the plate 44, each end of said member 45 pivotally supporting a rocker arm 46. The rocker arms 46 are provided with recessed portions 46a on the upper marginal edges thereof, the rear ends of said rocker arm being interconnected by a transversely disposed link rod 48, the forward ends of said rocker arms being interconnected by a curved rod-like shank clamp 49. The forward ends of the rocker arm 46 and the shank clamp 49 interconnecting the same are continuously biased or urged downwardly by means of a centrally located coil spring member 50 extending between the rear link rod 48 and the supporting frame 31.

The motors 37 are operated or controlled by means of a three-way control valve 51 which in turn is actuated by means of a valve actuating lever 52 which is pivotally mounted on the supporting frame and normally extends diagonally upwardly and forwardly of the frame 31 into the ham receiving recess and are continuously urged into such position by means of a coil spring 53.

Thus, a ham is readily mounted in the ham holder above described preparatory to the trimming of the fat therefrom by resting the lower end of the shank of the ham against the rest plate 44 and disposing the widest extent of the ham widthwise in the ham holder unit and pressing the same against the intermediate prongs 42, and towards and against the frame 31, the fatty side of the ham facing outwardly and the lower portion of the shank being cradled in the U-shaped bracket 43. The pressing of the ham into engagement with the prongs 42 causes the back of the ham to engage the valve actuating lever 52 which in turn actuates the control valve 51 to operate the motors 37 and drive the piston rods 39 and 41 connected thereto downwardly. This downward movement of the piston rods causes simultaneous downward movement of the upper prongs 38 into penetrating engagement with the ham. This downward movement also causes or effects simultaneous downward movement of the clamp actuating rods 41, the lower ends of which engage with the recesses 46a of the rocker arms 46 to drive and hold the same downwardly causing the same to pivot and swing the shank clamp 49 into engagement with the forward portion of the shank end of the ham to press the same against the U-shaped bracket 43 and tightly clamp the same thereagainst for the duration of the trimming or fat removing operation, the actual clamping positions being shown in broken line as seen in FIG. 12.

Referring particularly to FIGS. 10, 14 and 15, each of the ham holder mounting stations S is provided with a rack supporting and guiding block 54 which is suspended therefrom adjacent the forward end thereof. The opposite sides of the block 54 are each provided with an elongate rack receiving recess or guide channel 55, said channels being diagonally disposed to one another and diverging outwardly and forwardly as viewed from above, said channels being vertically spaced and horizontally parallel to one another and having rack members 56 and 56a slidingly and longitudinally disposed in said channels 55. Teeth 56 are provided on the inner faces of the forward or outer portions of the respective rack members 56 and 56a and face one another in general opposition to one another, the teeth of the upper rack 56 being adapted to intermesh with and engage the pinion 36 of the ham holder drive shaft 35, the teeth of the lower rack 56a being adapted to mesh with and engage the lower pinion 36a also carried by the ham holder drive shaft 35. The rear or inner ends of each of the racks 56 and 56a are provided with rollers 58 which are adapted to rotate about a vertical axis and which are adapted to be engaged by uniform motion cams for actuating the racks and driving the ham holder drive shaft 35 as hereinafter described.

Referring particularly to FIGS. 9, 13 and 17, the turret or turntable drive mechanism M includes a motor 59 which is mounted on the back side of the supporting base 20 by means of a motor mount 60, said motor driving a shaft 61 carrying a sprocket wheel 62 thereon. A housing 63 is mounted on the base 20 on the front side thereof and adjacent the ham removal station R. The housing 63 contains an eight stop 90 degree Ferguson indexing drive well known to those in the art and therefore not described in detail here, which is drivingly connected to a horizontally disposed spur-gear 64 disposed atop the housing 63 and meshed with and drivingly engaged with the spur-gear 24 for driving the turret or turntable T. The indexing mechanism is also cooperatively engaged with and driven by a driven shaft 65 which extends laterally outwardly therefrom and parallel with the motor shaft 61, the driven shaft 65 having mounted thereon a large sprocket wheel 66 which is driven by the motor 59 by means of a belt or chain member 67 which is trained about and interconnects the sprocket wheel 66 and the smaller motor sprocket wheel 62.

The large sprocket wheel 66 has mounted on the face thereof an elongate reciprocable rod or shaft 68 which is journalled in suitable bearing members 69 and continuously urged radially outwardly by means of a compression spring 70 wound about and connected to the shaft 68 by means of a collar 68a and disposed between the bearings 69. The outer end of the shaft 68 is provided with a bifurcated head 71 which has a cam roller 72 pivotally mounted thereon by means of a pivot pin 73, the rear end of which is slidingly received in an elongate slot which is radially disposed and provided in the face of the sprocket wheel 66 adjacent the marginal edge thereof. The pivot pin 73 also has mounted thereon adjacent the rear end thereof on the back side of the wheel 66 a guide roller 75 which is received and guided by a pair of radially disposed spaced apart roller guide members 76 carried on the back side of the wheel 66 adjacent the marginal edge thereof and defining a channel 74 therebetween. The head 71 has a star wheel engaging member or finger 77 for driving the star wheel 78 in a manner hereinafter to be described. An arm 79 is mounted atop the housing 63 and has a cam member 80 depending from the forward end of said arm 79, the cam 80 being adapted to engage the cam roller 72 in a manner and for a purpose hereinafter to be described.

A ham holder rotating system (best seen in FIGS. 10 and 14) is mounted on the supporting base 20 opposite each of the six cutter stations C for rotating the ham during the fat trimming operation as the ham holder mounting stations S are successively indexed to a position opposite successive cutter stations C. The ham holder transmission systems X are mounted on a vertical standard 81, each of said standards 81 having a pair of pillow blocks or bearing members 82 mounted thereon and having journalled therein a rotatable shaft 83. Each of the shafts 83 has mounted thereon intermediate the pillow blocks 82 a pair of drive sprocket wheels 84, one of which is adapted to drive shaft 83, the other of which is adapted to transmit driving power to the next adjacent shaft 83 at the next adjacent station, the sprockets 84 on adjacent shafts 83 at adjacent stations being drivingly interconnected by means of suitable endless chain or belt members 85 trained about the adjacent sprockets 84. Thus, the shafts 83 are successively drivingly interconnected for simultaneous rotation of all upon the driving of any one of them from an outside source. Each of the shafts 83 has mounted adjacent the upper end thereof one of the uniform motion cams 86 or 86a which are identical in configuration but which are positioned on the shaft at different elevations and rotated thereby in such a fashion as to drive one of the racks 56 or 56a by engagement with its respective roller, the upper uniform motion cams 86 being adapted to engage and push the upper racks 56, and the lower cams 86a being adapted to engage and push the lower racks 56a. Thus, every other station has a uniform motion cam 86 which engages and drives the upper rack 56 and rotates the ham approximately 180 degrees in one direction and the remaining alternate stations carry a uniform motion cam 86a which engages the racks 56a to drive the same and rotate the hams approximately 180 degrees in the opposite direction. The uniform motion cams 86 and 86a are so contoured as to drive or extend the rack with which they are cooperatively engaged a sufficient distance to cause the hams to rotate approximately 180 degrees during each complete movement of the rack and complete revolution of the cam.

FIG. 15 best illustrates the movement of the hams in response to the movements of the racks by the uniform motion cams. Stations C1 and C3 represent the first and third cutting or trimming stations and the position of the hams thereat at the completion of their rotation and trimming at that station as well as at successive odd numbered stations such as the fifth station (not shown in FIG. 15). The even numbered stations and the positions of the hams at the completion of their rotation and the trimming thereat are represented by station C2, which also represents the position of the hams at succeeding even numbered stations 4, 6, etc. The fatty layer to be removed from the hams covers approximately half or 180 degrees of the periphery of the ham and is faced outwardly when mounted on the ham holding unit previously described since, according to our invention, the fat is preferably removed in peripheral strips extending from one side of the fatty layer to the other. To accomplish this, the hams are positioned initially at each station at the start of each cutting operation with the cutting tools hereinafter to be described positioned so as to initially engage one side of the fatty layer and subsequently continuously work across the fatty layer to the other side due to the rotation of the ham with respect to the cutting tools at each station. Thus, assuming that the top racks 56 are engaged at the odd numbered stations and the bottom racks 56a engaged at the even numbered stations, the rack 56 is retracted and the rack 56a extended at the start of trimming operations at the first station (C1), with the side a of the fatty layer of the ham initially presented to the cutting tool. As the cam rotates, the rack 56 is extended, rotating the ham (in a counterclockwise direction as seen from above) and simultaneously retracting the rack 56a due to the reverse engagement of the racks with the pinions 36 and 36a respectively on the ham holder drive shafts 35, the racks, ham and ham holder assuming the position shown at station C1 of FIG. 15 at the completion of the operation thereat.

This final position at station C1 is maintained as the turntable or turret is indexed to deliver the ham and ham holder to the second station C2, the final position of C1 becoming the initial position of C2. The retracted rack 56a is then engaged by the cam 86a at the second station and moved forwardly, causing the ham to oscillate or rotate in a clockwise direction (as viewed from above) or in a direction of rotation opposite to that at the preceding station so that the ham retraces the path followed at the preceding station, the ham assuming the position shown at C2 upon completion of rotation, with the rack 56a extended and rack 56 retracted and ready to be moved at the next station in the manner previously described as taking place at C1. And so, the ham is alternately rotated in the manner above described at each of the succeeding stations until leaving the last of the trimming stations.

The ham holder drive system D (best seen in FIGS. 13 and 18) for transmitting driving power from the main drive mechanism M through each of the ham rotating systems X hereinabove described to the ham holders H for rotation of the hams at each of the operational stations includes a bevel gear 87 mounted on the lower end of one of the shafts 83 which in the particular form illustrated in the drawing is located at the fifth cutter station. The bevel gear 87 is cooperatively meshed with another bevel gear 88 mounted on the end of a rotatable horizontal shaft 89, which shaft is supported by and journalled in suitable bearings 90 mounted on the standards 81. The shaft 89 is provided with a drive sprocket 91.

A star wheel 78 is mounted in direct opposition to the sprocket wheel 66 on a rotatable shaft 92 which is journalled in suitable bearing members 93 which are mounted on the supporting base beneath the sixth cutter station as shown in the drawings. The shaft 92 is provided with a sprocket 94 intermediate the bearings 93 and is drivingly engaged with the sprocket 91 by means of a suitable endless chain or belt 95. The star wheel 78 consists of four equi-spaced fingers 96 offset from each other by 90 degree angles, the outer end of each of said arms 96 being provided with a forwardly projecting finger 97 which are adapted to be engaged and driven by the finger 77 carried by the opposing sprocket wheel 66. Thus, the driving power to rotate all of the uniform motion cams simultaneously is supplied to the previously described drivingly interconnected drive shafts 83 by driving one shaft 83 at a single station, in this case the fifth, by means of the drive mechanism including the star wheel 78, drive sprockets 91 and 94, and bevel gears 87 and 88.

The operation of the drive system is as follows: The sprocket wheel 66 is continuously driven by the motor 59, the continuously rotating sprocket wheel 66 serving to transmit driving power to the ham holding units by engagement with the star wheel 78 and to the spur gear 64 for driving the turret T through the medium of the indexing system in the housing 63. Although the sprocket drive shaft 65 is continuously driven or rotated, the spur gear 64 is only intermittently driven at appropriate predetermined times to periodically index the turret or turntable T to carry the hams from one cutter station to another. As the cam roller 72 carried on the sprocket 66 engages the cam 80, the roller is depressed thereby which simultaneously depresses the finger 77 carried by the sprocket wheel 66 and moves the fingers 77 out of engagement with one of the fingers 97 of the star wheel 78 which it had previously engaged for approximately 270 degrees of rotation and re-engages the star wheel by engagement with the next adjacent finger 97 after the wheel 66 has rotated through 90 degrees after having been released by the cam 80 from engagement with the star wheel 78. During this 90 degree rotation following release by the cam 80, the star wheel is not engaged and therefore the hams are not rotated during this period as they are being indexed or delivered to the next succeeding operation station. At the same time, during this 90 degree period of rotation by the star wheel 66, the spur gear 64 is driven by means of the Ferguson drive indexing system thereby causing the turret to rotate a predetermined distance of travel, which distance is expressed by the relationship of the number of operational stations to 360 degrees which, in the form shown, is a distance of 45 degrees. After the turntable has been indexed through said 45 degrees to carry the hams to the next succeeding station, the star wheel is re-engaged by the finger 77 and rotated through 270 degrees back to the cam 80, during which period of 270 degrees rotation the spur gear 64 is idle as well as the turntable T to maintain the mounting stations S stationary during this period to enable the fat trimming operation to take place at each of the trimming stations. As the star wheel 78 is rotated through said 270 degrees of rotation, the hams located at each of the cutter or trimming stations C are rotated through a distance of approximately 180 degrees through the medium of the interconnected gear mechanism and rotating system previously described.

After the hams leave the last or sixth cutter station as shown in the accompanying drawings, the trimming of the fat has been completed and the hams are then delivered to the ham removal station R, where the trimmed ham is removed therefrom and to which an untrimmed ham is fed after the next indexing of the turntable of the empty ham holder unit to the ham feeding station F where an untrimmed ham is mounted on the ham holders in the manner previously described.

During the period in which a ham holder station moves from the sixth or last cutter station to the first or initial cutter station, it is desirable to maintain the ham holding units stationary together with the hams thereon and to have the ham holder disposed during this period of travel facing outwardly to permit the hams to be readily removed therefrom and fed thereto. To accomplish this, a pair of arcuate cam guides or tracks 98 and 98a (shown in FIGS. 8 and 18) are provided one above the other, one of which (98) is in alignment with the racks 56 for engaging same, the other guide 98a being adapted to engage the racks 56a. The rollers 58 of the racks 56 and 56a bear against or engage their respective cam track guides 98 and 98a to hold the racks stationary during the period indicated. As best seen in FIG. 8, the tracks 98 and 98a are divergent and spaced apart with respect to one another at the end thereof adjacent the last trimming station, so as to pick up and engage the rollered rear ends of the racks as the mounting station is indexed away therefrom, the top track 98 diverging rearwardly and engaging the retracted rack 56, the bottom track 98a engaging the extend rack 56a. The tracks 98 and 98a converge as they proceed towards the ham removal station R, moving the racks into side by side relationship as viewed from above and holding them in that position, thereby rotating the ham holder approximately 90 degrees to assume an outwardly facing position to make the ham carried thereon readily accessible to the operator. The tracks 98 and 98a remain aligned as they extend to the adjacent ham feeding station F to maintain the same outward position of the holder thereat. However, as the tracks leave the feeding station F and proceed towards the first cutting or trimming station C1, the top track 98 again diverges rearwardly with respect to the lower track 98a, causing the ham in the mounting station approaching cutting station C1 to rotate approximately 90 degrees to turn the ham into its initial cutting position with one edge a of the layer of fat presented to the cutting tools in the manner hereinabove described, after which the hams and cams rotate through the predetermined degree of movement to assume the positions illustrated in FIG. 8, which represent the positions of the racks and cams at the completion of the trimming operations at each station and immediately prior to the mounting stations being indexed to the next succeeding cutting station.

With reference to FIGS. 1 and 8, each of the cutter stations C are similar in nature and include vertically disposed supporting members or plates 99 which are radially disposed with respect to the center shaft or spindle 21 and are mounted on the supporting base 20. The plates 99 have mounted thereon horizontally disposed mounting plates 100 on which are mounted vertical supporting plates 101 which have extending forwardly therefrom from the upper ends thereof fat shield support brackets 102 upon which are mounted a protective semi-annular fat shield 103 which is preferably heated by any suitable means (not shown) to prevent the fat from sticking thereto and continuously overlies all the fat removal area extending from the first through the last of the cutting or trimming stations C.

A semi-annular fat collection trough 104 is mounted on the supporting plates 99 beneath the fat shield 103 and beneath the ham holding units and fat removal area to collect the fat which is removed from the hams at each of the respective cutting stations. A fat sweep 105 is carried by the turret assembly T and rotates therewith to progressively sweep the fat collected in the trough 104 towards the last cutter station from whence the fat is removed to a suitable receptacle or conveyor (not shown). A pair of intersecting baffle plates 106 which are generally vertically disposed and slightly inwardly and downwardly inclined are provided between each of the cutter stations and extend diagonally inwardly so as to generally face the ham being trimmed from the front side thereof to intercept any fat which might be thrown laterally by the rotary cutters hereinafter to be described, the baffles 106 and overhead shield 103 cooperating to confine the fat removed to the trimming area and direct the same downwardly to the collection trough 104. Movable side baffles (not shown) may also be provided adjacent the entrance to the first cutting station and exit from the last cutting station to prevent the fat from being thrown into the ham removal and ham feeding areas.

The baffle plates 107 are supported by means of baffle support brackets 107 which are mounted on cross bracing members 108 which extend between each of the adjacent cutter stations.

The vertical supporting plates 101 are adapted to have mounted thereon a plurality of fat removing members or cutting assemblies referred to in the entirety by 109 (and somewhat schematically illustrated in FIGS. 1, 8, 15 and 16), the number of which may and the position of which relative to the hams will vary from station to station. The preferred cutting assemblies shown in the drawings in FIGS. 2, 3 and 19 consist of rotary cutters adapted to repeatedly reciprocate toward and away from the hams as the hams are rotated relative thereto and include a pneumatic double acting cylinder 110 having a tubular air cylinder piston rod 111 upon which is mounted a suitable cutter mounting head 112. The cutter mounting heads 112 include a forwardly extending cylindrical guide sleeve 113 having a beveled forward leading edge 114 for guiding the cutters into the fat to be trimmed.

The cutter unit itself includes a frustro-conical forwardly tapered head 115 which rotates within the sleeve 113. The head 115 is mounted on the end of a drive shaft 125 which passes through the bore of the piston rod 111, the rear end of said drive shaft being drivingly engaged with a suitable air motor (not shown) for rotation thereby.

The cutter head 115 has mounted thereon for rotation therewith a transversely disposed generally kidney shaped cutter blade or knife 116 and an offset side cutter 117 which are driven simultaneously to cut and disintegrate the fat enclosed within the sleeve 113. The cutter blade 116 is adapted to sweep substantially the entire inner cross-sectional area of the sleeve 113 except for that portion immediately adjacent the inner wall of the sleeve which is adapted to be circumferentially swept by the side cutter 117. It should be also noted that the cutters 116 and 117 are disposed immediately inside and contiguous with the leading edge of the sleeve 113. The sleeve 13 is backed by a probe mounting head portion 118 having an interior steam groove 126, the head portion 118 having mounted thereon a series of circumferentially spaced elongate probes 119 which extend through suitable longitudinally disposed openings or bores provided in the wall of the sleeve 113. The probes are adjustably mounted for longitudinal adjustment to selectively vary the extent to which they extend beyond the leading edge of the sleeve to control the depth of cut and the thickness of the fat layer to be left on the ham after trimming.

The probes 119 extend forwardly of the cylindrical housing 113 a distance which approximates and controls the depth of cut desired and which also controls the amount of fat which will be permitted to remain on the hams after the trimming operation is completed, the distance between the ends of the probes and the leading edge of the sleeve representing the approximate depth of the layer of fat permitted to remain on the ham after the trimming has been completed.

Each of the probes 119 in the form shown consist of a central core of wire 120 the forward portion of the wire being preferably of platinum and the upper portion of the wire being preferably of cold drawn stainless steel wire. The wire 120 is enclosed and surrounded throughout substantially its entire length by suitable Teflon insulation 121 which in turn is encased in a metallic tubular housing 122 made of a material such as Inconel. The probes 119 are adapted to be mounted on the mounting heads by any suitable means such as the threaded plug 123. The rear end of the probes 119 are provided with a metallic contacter 124. The functional aspects are such that the probes are adapted to control the movements and position of the cutter head in response to their engagement with either the fat or the lean of the meat which provide different resistances and conductivities and therefore the differences in the resistances provides a means for controlling the depth of cut of the cutter heads in response to the contact of the probes with the fat or the lean. Thus, when the probes have extended through the fat and engage the lean of the meat, a depth control sensing circuit (hereinafter to be described) automatically responds to the differences in substances and resistances encountered by the probes and causes the forward movement of the cutter to be reversed and the cutter head to be withdrawn from engagement with the hams to terminate that particular cutting operation or cycle, the rearward movement of the cutters then being automatically reversed to re-engage the cutters with the ham in the area adjacent the preceding cut presented by the ham as it rotates with respect to the cutters, a single cutter ultimately traversing the entire width of the fatty layer to remove a continuous elongate peripheral strip of fat therefrom. Each of the cutter head assemblies at each of the stations are disposed in vertically spaced apart relationship to remove alternate strips of the fat on the ham through approximately 180 degrees of the periphery of the ham representing the extent of the layer of fat to be removed. The probes and cutters are disposed in any desired position which will accommodate the cutter heads to the irregular contour of the hams and provide the most accurate trimming operation possible and to leave as uniform a layer of fat as possible on the lean of the meat, the cutter head assemblies being disposed and reciprocating at substantially right angles to the thickness dimension of the fatty layer to be trimmed. The cutter head assemblies are disposed with relation to one another at succeeding stations so that strips of fat are removed at succeeding stations which are adjacent to the strips which were previously removed at preceding stations, the cutters at all of the stations cooperating to cover substantially the entire fatty layer and remove the fat therefrom to a uniform depth throughout. It should also be understood that the depth of cut is controlled not only by the spacing between the ends of the probes and the guide sleeve, but also by the sensing circuit, the rate of response or sensitivity of which may be adjusted as desired. The actuation of the cutter head assemblies against the surface of the ham is accomplished by actuation of the pneumatic cylinder 110 which in turn is actuated or controlled by any suitable pneumatic control means therefor, the pneumatic control means for the cylinder being in turn controlled by any suitable depth control sensing circuit which is connected with the probes. Contact of the probes with the lean of the ham retracts the cutter head, and a switch contact or other means moves the cutter head towards and against the ham.

The lean portion of the ham underlying the outer fat layer is frequently interspersed with veins of fat which extend inwardly from the border or interface between the lean and outer layer of fat. If a probe encounters one of these veins of fat the cutter will not be retracted at the proper time by said probe. Therefore, each cutter is provided with a plurality of probes, each of which is adapted to react independently of the others to insure that the lean meat at the border or interface between the lean and outer fat will be contacted by at least one probe and that the cutter will be retracted at the time desired.

FIG. 24 illustrates a cutter in the process of trimming a strip of fat from the surface of a ham so as to leave a thinner substantially uniform layer of fat covering the lean meat. A cross-section of a portion of a ham is shown, having an outer untrimmed layer of fat 125 covering the inner lean meat 126. The ham is rotating in the direction of the arrow 127 relative to the cutter 109 which is reciprocating along a fixed line of travel in the direction of the arrow 128 towards and away from the ham, the movement of the cutter being in the direction of the thickness dimension of the outer layer of fat to be trimmed and generally normal to the surface of the lean meat underlying the fat. In the illustration, the cutter has already traversed part of the ham's surface and successively cut out a series of fat segments 129 shown in broken outline (the last removed fat segment being identified by the numeral 129') leaving a thinner uniform layer of fat 130 covering the lean meat. The cutter is shown in retracted solid line position ready to move forward to remove another segment of fat adjacent the last segment 129' previously removed. The cutter moves forwardly from its retracted solid line position into the outer fat layer towards the lean meat until the probes 119 contact the lean meat 126, as shown by the broken line position of the cutter in FIG. 24. When one of the probes contacts the lean meat, the sensing circuit which controls the movements of the cutter is actuated, stopping the forward movement of the cutter a predetermined distance from the lean meat so as to leave the layer of fat 130 covering same, and further causing retraction of the cutter to its retracted solid line position for a repetition of the just described cutting operation on the next fat segment exposed to the action of the cutter by the rotation of the ham.

As previously indicated, any suitable pneumatic control means can be provided for actuating the pneumatic cylinder and the air motor, which pneumatic control systems are well known to those skilled in the art. However, in one preferred form, the reciprocating movements of each of the pneumatic cylinders of each of the cutting assemblies is controlled by a solenoid air valve which controls the reciprocating movements of the pneumatic cylinder by reversing the flow of air thereto to opposite ends thereof. Each of the solenoid valves is in turn controlled by the sensing circuit. Each of the cutting assemblies and the control systems therefore are also provided with forward and retract limit switches, which limit switches are actuated by the engagement of the cutter mechanism therewith, said limit switches controlling the limit of forward and reverse movement of the cutters respectively. Under normal operating conditions, the forward movement of the cutters will be limited and controlled by the probes rather than by the forward limit switch, the forward limit switch being provided in the event that the probes do not make contact with the lean meat by the time the cutter has reached the end of its forward stroke.

Also, as previously noted, any suitable sensing circuit can be provided for controlling the movements of the cutters. One preferred arrangement is shown in the accompanying drawings in FIGS. 20 through 23 inclusive. Each defatting position or station has a separate controller unit for each of the cutters mounted at said station. Each of these controller units may be combined in a single closure or cabinet as shown in FIG. 20. The particular cabinet shown in FIG. 20 has two separate identical controller units assembled therein for two cutters identified as numbers 1 and 2 but it will be apparent that the number of units may be varied as desired according to the number of cutters mounted at the particular station. The particular sensing circuit shown and described herein is designed to differentiate between fat and lean meat and incorporates transistorized logic modules. Transistors are ideally suited for fast switching, power requirements are low, and life expectancy is great. The modules in this system are so arranged that the differential input signals or the absence of power, either intentional or accidental, will cause retraction of the defatting cutter. Origination of input triggering pulses is accomplished in an arrangement of the six sensing probes illustrated which uniformly encircle the outer circumference of the rotating cutter and which extends forwardly of the cutter. The distance which the probes extend beyond the base of the cutter is adjustable and can be varied to any amount. The probes consist of a central wire separated by an insulator from the surrounding metal tube with the tips beveled at a 45° angle. This beveled surface on the tip of the probes measures the conductivity or resistance of the lean meat by imposing a small D.C. potential across it. Resistance measurements have shown a significant differential when the tip is in contact with fat as compared to contact with lean meat of an average ham, the lean being around 22,000 ohms and the fat around 28,000 ohms.

In one typical cutting unit which has proved successful, we employ a rotating cutter having an outer circumference of 2″ with the probes extending forwardly of the cutter by ⅜″ which probes can be adjusted to any amount from 0 up to 1″.

The control cabinet of FIG. 20 is provided with suitable switches, including the D.C. power switches E1 and E3, the manual reset switches E2 and E4, the meter switches E5, the number one cutter switch E6 and the number two cutter switch E7. Suitable potentiometers P12 and P14 are also provided for each of the cutter controls. Each separate controller unit for each of the cutters is divided into two halves. The first half is comprised of probe inputs J, K and L, and their respective transistor amplifiers labeled as TR1. Each input circuit has its respective bistable multivibrator modules, commonly called flip-flops, which are identified as FF1, FF2 and FF3, each flip-flop consisting of two transistors labeled TR2 and TR3. The normally "on" outputs of these flip-flops are fed into a three input "AND" gate G1 comprised of three diodes labeled Y1, Y2 and Y3 which are paralleled on the base of power amplifier TR4 and a control relay labeled CR1. The second half of the cutter controller is a duplicate of the first half, and includes the probe inputs U, V and W, their respective amplifiers TR1, flip-flops FF4, FF5 and FF6, and gate G2 and power amplifier TR5 and control relay CR2. The normally open (N.O.) contacts of CR1 and CR2 are in series with the air valve solenoid SOL1. Both relays have to be energized before the cutter will go forward. The power transistors TR4 and TR5 control their respective relays CR1 and CR2. The control relays CR1 and CR2 actuate the air valve solenoid SOL1. The probe sensitivity control (TR1 biased circuit) determines the amount of resistance needed at the probe to trigger TR4. The relay sensitivity control (TR4 biased circuit) determines the current operating point of its respective control relays. TR4 and TR5 are three input "AND" circuits with one output. The circuitry is also provided with suitable resistances labeled N and condensers labeled Z.

FIG. 21 is a diagram of the logic network of each complete controller unit. FIG. 22 is a diagram of the basic controller circuit as applied to a single probe. FIG. 23 is a schematic diagram of the relay boards.

At the beginning of sequences of each defatting cycle the cutter will be in retract position. The closure of the reset switch E2 or the retract limit switch E10 (provided all power switches are on) will put all six flip-flops in an "on" or stable state (TR2 conducting and TR3 cut off). TR4 and TR5 will then be conducting with full output, and relays CR1 and CR2 will then be energized. The relay contacts will be closed completing the A.C. circuit to the cutter air valve solenoid. Forward movement of the cutter will now commence. If the probes should not make contact with the lean meat the cutter is retracted by the forward limit switch E11 actuated by the cutter head. In one form of our invention the forward limit switch E11 is actuated by the cutter head ½″ from the end of the forward stroke and the retract limit switch E10 is also actuated ½″ from the end of the reverse stroke. In the particular arrangement noted, the cutter is capable of a 4″ stroke, and with the forward and retract limit switches E11 and E10 located at ½″ from each end, these two limit switches give a maximum 3″ of oscillatory action to the cutter head movement and cushioning of the air cylinder is then maintained. When the hams are located at the proper positions so that the surface is within the range of forward movement of the cutter, within 3″ in the particular instance noted) the probes will originate the input retracting pulses due to contact with lean meat. Triggering action of each probe is independent of one another, which means that only one probe pulse is needed to cause retraction but all six probe pulses can occur at the same time with no false effects.

Consideration is next given to the action of one probe only. The probe response to the lean meat resistance threshold is preset by adjusting the bias potentiometer P1. The setting of P1 will determine the actual low value of resistance that the probe has to achieve in order to change conduction of TR1 and trigger the multivibrator FF1. When FF1 is triggered, it will remain off until reset by the manual reset switch E2 or the retract limit switch E10.

With the changing of FF1 to "off" or zero state, the gate G1 is reduced by one input. This causes the conduction of TR4 to decrease and de-energize the CR1 relay. Solenoid SOL1 will also de-energize causing the air valve to reverse and revert air to the front of the air cylinder causing retraction. The end of one complete cycle is when it reaches the retract limit position, and the next cycle is ready to begin.

To give the fastest operating frequency of the reciprocating air cylinder, the reset switch E2 is left closed and not opened between cycles. When this is done, the cutter will reverse as soon as the probes are free of contact with lean meat, in which case the cutter heat will oscillate in a zone in front of the lean meat surface substantially corresponding to the distance which the tips of the probes extend beyond the cutter (substantially within a zone of ⅜″ in the particular example previously noted). In this high frequency method of operation the flip-flops act similar to a mono-stable or one shot multivibrator.

In operation, the speed of reciprocation of the cutters and the speed or rotation of the ham may be varied as desired to accomplish the uniform trimming of the hams. In one successful embodiment of this invention, the cutters operate at a speed of five cycles per second and the hams are rotated at such a rate that it takes 5.2 seconds to rotate through 180° of movement.

Although the drawings show three cutter head assemblies mounted at each station, it should be understood that the number of such assemblies at each station and the total number of assemblies employed at all of the stations may be varied as desired, although at least twelve of such 2″ diameter cutter head assemblies are normally necessary to accomplish complete removal of the fatty layer from the ham.

The operation of the apparatus of our invention is as follows: The hams are initially mounted on the turntable at the feeding station F in the manner previously described. The turret is then indexed 45 degrees carrying the hams to the first cutter station at which point the turntable is stopped and the hams are rotated past the cutter heads at the first cutter station by means of the rack members and cams in the manner previously described. During the indexing of the hams from the feeding station to the first cutting station, the hams are rotated approximately 90 degrees by means of the cam tracks 98 and 98a so that upon reaching the first cutting station the marginal edge a of the fatty layer of the ham is initially presented to the cutters. Each of the rapidly reciprocating cutters located at the cutter station initially engages the marginal edge a of the ham, and proceeds to successively cut away adjacent portions of the fat due to the rotation of the ham relative to the cutter, thereby removing a strip of fat from the hams leaving a predetermined layer of uniform thickness remaining thereon, the strip extending across roughly one half or approximately 180 degrees of the face of the ham. When the trimming operation has been completed at the first station and the ham has been rotated through 180 degrees, the turntable is then indexed another 45 degrees, carrying the ham from the first station to the second station where a cutting operation is repeated on the portion of the fat not previously trimmed. As the ham is indexed to the second station, the final position of the ham at the first station is maintained through the indexing movement to become the initial position at the second station, with marginal edge *b* of the fatty portion being initially presented to the cutters at the second station. The ham is then rotated at the second station in a direction opposite to that at the first station so that the ham retraces its path of travel past the cutters to assume a final position similar to the initial position at the first station. The operation is thus successively repeated through all of the cutter stations including reverse rotation of the hams at succeeding stations until all of the excess fat has been trimmed or removed from the ham. The ham is then indexed from the last cutter station to the ham removal station where the hams are removed from the mounting station and an untrimmed ham is then added when the empty ham holder is indexed to the next or feeding station.

FIGS. 4–7 diagrammatically illustrate a ham mounted on a ham holder unit H at various stages in the trimming thereof. FIG. 4 shows the untrimmed ham at the start of the trimming operations, FIGS. 5 and 6 illustrate the partially trimmed ham at intermediate stages, and FIG. 7 shows the completely trimmed ham, with the thickness of fat removed being shown in dotted outline.

In one form of our invention which has proved to be very satisfactory, the turntable is indexed 720 times per hour thus enabling a single machine of the form illustrated to successfully trim 720 hams per hour in a substantially completely automatic fashion.

From the foregoing, the advantages of our invention are readily apparent. The apparatus above described permits a large number of hams to be continuously trimmed or defatted uniformly, automatically and quickly. The only manual operations required are the mounting of the untrimmed hams and the demounting of the trimmed hams by an operator, thereby materially reducing the time, costs and amount of labor required. In addition, the hams are trimmed more quickly and with greater accuracy than is possible with methods and apparatus presently available thereby improving and up-grading the quality of the hams processed and distributed to the consumer.

It will, of course, be understood that various changes may be made in the form, details, arrangement and proportions of the various parts without departing from the scope of our invention.

What is claimed is:

1. Apparatus for trimming excess surface fat from hams and the like comprising a series of rotatable ham holders, a series of trimming stations, each of said trimming stations have mounted thereon at least one cutting tool adapted to penetrate the fat in a direction generally normal thereto and remove a portion of the fatty surface of said ham, means effecting relative movement between said series of stations and ham holders for successively positioning the holders at successive trimming stations for treatment by the cutting tools mounted thereon, means for rotating each holder when positioned at each of said trimming stations and means for repeatedly reciprocating said cutting elements into and out of the fat in a direction generally normal thereto while said ham is rotating causing each of said tools to remove a series of overlapping portions providing a continuous groove in the fat, the cutting tools being staggered with respect to each other and cooperating to remove parallel overlapping strips of fat from substantially the entire surface of the fatty portion of said ham.

2. Apparatus for removing fat from the face of hams and the like comprising a series of rotatable ham holders adapted for simultaneous movement along a circular path of travel, a series of trimming stations disposed concentrically with respect to said path of travel, each of said trimming stations having mounted thereon at least one cutting tool adapted to remove a strip of fat when a ham is rotated relative thereto, means for intermittently moving said holders along said path of travel and successively delivering each holder and the ham carried thereon to each of said series of trimming stations, means for moving each holder as it is delivered to the first of said series of trimming stations to a position in which a marginal edge of the fatty portion is disposed opposite the cutting tools at said station, means rotating the holders and their hams after said positioning with respect to said cutting tool through a distance substantially corresponding to the peripheral extent of said fatty surface to enable said tool to traverse the fatty portion of the ham and remove a continuous strip of fat therefrom to assume a position adjacent the other marginal edge thereof, means stopping said rotation when the cuttting tools have reached said other edge whereby said holder remains in said last named position until it is delivered to the next succeeding trimming station, the tools at said next station being positioned so as to initially engaged said other marginal edge of the fatty portion, means rotating said holders and their hams with respect to the cutting tools at said next station through the same distance of movement but in reverse direction from that at the previous station to remove additional continuous strips of fat from the face of the fatty portion, means stopping said reverse rotation after said degree of rotational movement has been completed, means repeating this intermittent reverse rotation of said holders at each succeeding trimming station, the cutting tools provided by said series of trimming stations cooperating to remove overlapping strips of fat from substantially the entire fatty surface of said hams.

3. Apparatus for removing fat from the face of hams and the like comprising a turntable, a circular series of equi-spaced rotatable ham holders mounted on said turntable for simultaneous movement therewith about a common axis, a series of equi-spaced operational stations concentrically surrounding said series of holders and having the same angular degree of separation as said holders, said series of stations including a feeding station for mounting hams on empty holders, a series of trimming stations each having at least one cutting tool adapted to remove a continuous strip of fat from a ham when it is rotated relative thereto, and a discharge station for removing the defatted hams, means intermittently indexing said turntable to simultaneously move each holder to the next succeeding station and successively deliver each holder to each of said operational stations, means independently and simultaneously rotating each of said holders positioned at a trimming station to enable each tool to remove a continuous strip of fat from the fatty portion of each of said hams, the tools provided by said series of trimming stations removing overlapping parallel strips of fat from substantially the entire fatty portion of said hams, said tools including rotary cutters disposed for rotation about an axis generally perpendicular to that portion of the fatty surface to be engaged thereby, means for reciprocating said cutters longitudinally of said axis into and out of the fat sensing means preceding said cutters for controlling the depth of said cutters, means responsive to said sensing means for arresting the forward movement of and withdrawing said cutters from engagement with said hams when the sensing means contact the lean portion underlying the fat and re-engaging the cutters with said hams in an overlapping area adjacent that previously engaged as the hams are rotated therepast.

4. Apparatus for removing fat from the face of hams and the like comprising a turntable, a circular series of equi-spaced rotatable ham holders mounted on said turntable for simultaneous movement therewith about a common axis, a series of equi-spaced operational stations concentrically surrounding said series of holders and having the same angular degree of separation as said holders, said series of stations including a feeding station for mounting hams on empty holders, a series of trimming stations each having at least one cutting tool adapted to remove a continuous strip of fat from a ham when it is rotated relative thereto, and a discharge station for removing the defatted hams, means intermittently indexing said turntable to simultaneously move each holder to the next succeeding station and successively deliver each holder to each of said operational stations, means independently and simultaneously rotating each of said holders positioned at a trimming station to enable each tool to remove a continuous strip of fat from the fatty portion of each of said hams, the tools provided by said series of trimming stations removing overlapping parallel strips of fat from substantially the entire fatty portion of said hams, and shielding means mounted at each trimming station overlying and partially enclosing the hams and cutting tools during the trimming operation and confining the fat removed to the trimming area.

5. The structure set forth in claim 4, and trough means disposed beneath said shielding means for receiving the removed fat confined thereby.

6. The structure set forth in claim 5 wherein said trough means extend beneath all of said trimming stations and provide a continuous fat removing channel, and including a sweep arm adapted to rotate with said turntable and travel substantially the entire length of said channel and remove the fat therefrom.

7. Apparatus for removing fat from the face of hams and the like comprising a turntable, a circular series of equi-spaced rotatable ham holders mounted on said turntable for simultaneous movement therewith about a common axis, a series of equi-spaced operational stations concentrically surrounding said series of holders and having the same angular degree of separation as said holders, said series of stations including a feeding station for mounting hams on empty holders, a series of trimming stations each having at least one cutting tool adapted to remove a continuous strip of fat from a ham when it is rotated relative thereto, and a discharge station for removing the defatted hams, means intermittently indexing said turntable to simultaneously move each holder to the next succeeding station and successively deliver each holder to each of said operational stations, means independently and simultaneously rotating each of said holders positioned at a trimming station to enable each tool to remove a continuous strip of fat from the fatty portion of each of said hams, the tools provided by said series of trimming stations removing overlapping parallel strips of fat from substantially the entire fatty portion of said hams, and means for maintaining the holders in a fixed position when they are located at said feeding and discharge stations.

8. Defatting apparatus for hams and the like comprising a series of equi-spaced rotatable ham holders adapted for simultaneous movement along a common circular path of travel, a series of equi-spaced operational stations concentrically arranged with respect to said path of travel and having the same angular displacement from each other as said holders and including a ham feeding station for mounting hams on empty holders, a series of trimming stations each having at least one tool mounted thereon adapted to reciprocatingly penetrate the fat of said hams at substantially right angles thereto within a predetermined distance of the lean portion underlying the fat and cut away a small portion of the fat during a single engagement therewith and then withdraw from the fat and re-engage the fatty portion in an untrimmed overlapping area adjacent the previously cut-out area, and a discharge station for removing the defatted hams, means for simultaneously moving said holders along said common path of travel to their respective next succeeding station and successively deliver each holder to each of said operation stations, drive means located at each of said trimming stations for disconnectably engaging and rotating each of the holders simultaneously relative to the cutting tools to permit each tool to remove a series of overlapping portions of fat providing a continuous groove from one side of the fatty portion to the other, the tools at all of said trimming stations cooperating to remove overlapping parallel strips of fat from substantially the entire surface area of the fatty portion of said ham, each of said drive means being adapted to rotate the holders and their hams at each trimming station through the same degree of rotation substantially corresponding to the peripheral extent of the fatty portion about the hams, the drive means at alternate stations turning the holders in a direction opposite to that at the other stations, timing means for indexing the holders to the next succeeding station upon completion of said rotative movement, thereby disengaging the holders from the drive means whereby the holders maintain their position during said indexing and are delivered to the next station in the same position as they were upon completion of trimming at the previous station, the cutting tools at each station being positioned to initially engage the fatty portion adjacent the leading marginal edge thereof with respect to the direction of rotational movement at the respective stations permitting the tools to traverse substantially the entire width of the fatty portion of each ham.

9. Apparatus for mounting a ham for rotation about its shank axis for removing fat from the fatty portion thereof, said apparatus comprising an elongate ham supporting frame rotatable about its longitudinal axis and adapted to engage and support the lean portion of a ham placed thereagainst with the shank axis thereof generally parallel to the longitudinal axis of said frame, a pair of longitudinally movable prong elements mounted on one end of said frame and adapted to penetrate and hold the head of said ham, stationary prongs mounted on said frame intermediate the ends thereof and extending forwardly therefrom to penetrate and engage the back of said ham, a retaining bar pivotally mounted adjacent the other end of said frame for swinging movement towards and away from the lower portion of said frame and the shank portion of a ham mounted thereon, fluid motor means mounted rearwardly of said frame, said motor means including a piston member longitudinally movable with respect to said frame and connected at one end to said movable prongs and adapted to engage said retaining bar to move the same into and out of engagement with said ham, and switch means poistioned forwardly of said frame for controlling the movements of said piston and adapted to be engaged by a ham placed against said frame.

10. A cutting tool for removing fat from hams and the like comprising a cylindrical cutter guide sleeve, at least one rotary cutting blade mounted for rotation within said sleeve, means for reciprocating said tool into and out of the fat, probe means mounted on said sleeve extending forwardly thereof to selectively control the depth of cut of said tool, said probe means being responsive to the variations in conductivity between the fat and lean portions of the ham, and control means responsive to said probe means for withdrawing said tool from engagement with said ham when the probe means make contact with the lean portion.

11. The tool of claim 10 wherein a pair of cutting blades are provided within the sleeve, one of said blades being disposed generally parallel and adjacent to the sleeve wall and rotating in a path generally concentric therewith, said other blade rotating in a plane generally transverse to the axis of said sleeve.

12. Apparatus for trimming fat from the periphery of hams and the like comprising a turntable, a plurality of rotatable ham holders mounted on said turntable and arranged in equi-spaced circular series thereon for simultaneous movement along a common circular path of travel, a series of trimming stations generally concentrically arranged with respect to said path of travel and having the same angular displacement from each other as said holders, each of said trimming stations having at least one cutting tool adapted for repeated reciprocating movement into and out of trimming engagement with the hams carried by said holders, drive means for intermittently indexing said turntable to simultaneously move said holders to their next succeeding trimming stations, means carried by said turntable for rotating the ham holders and the hams mounted thereon at each trimming station through a predetermined degree of rotation generally corresponding to the peripheral extent of the fatty portion of the ham, said last named means including a drive shaft connected to each of said holders for rotating same and having a pair of pinions coaxially mounted thereon, a pair of rack members disposed on opposite sides of said drive shaft, each of the racks engaging one of the pinions, rack motivating means mounted at each trimming station and including a uniform motion cam adapted to engage one of said rack members and move the same through a predetermined distance to rotate the ham holder through said predetermined degree of rotation, the cams at each succeeding station alternately engaging the rack members to reverse the direction of rotation from that at the preceding station, said cams being adapted to rotate said holders substantially simultaneously, the tools of each station being positioned relative to the hams delivered thereto so as to initially engage the fatty portion adjacent the leading marginal edge thereof with respect to the direction of rotation of the holder and ham at each station, each of said tools cutting out a series of overlapping fat portions and cuttingly traversing the periphery of the fatty portion of each ham to remove a continuous strip of fat therefrom, the tools at all of the trimming stations cooperating to remove parallel overlapping strips substantially the entire fatty portion of each of the hams.

13. The apparatus set forth in claim 12 and means for idling said cams after rotation of the holders has been completed and during the period in which the holders are being indexed to the next succeeding trimming and resuming rotation thereof after indexing has been completed.

14. The apparatus set forth in claim 12 wherein there is at least one more holder than trimming station, thereby providing an open area between the last and first trimming stations of said series for removing the trimmed hams from their holders and replacing them with untrimmed hams.

15. The apparatus set forth in claim 12, wherein the cams and rack members engaged thereby cooperate to rotate the holders and their hams through approximately 180 degrees of rotation at each of the trimming stations.

16. The apparatus set forth in claim 12, including trough means disposed below the trimming areas to collect the fat removed from the hams, and baffle means enclosing the trimming area and directing the fat to said trough means.

17. The apparatus set forth in claim 12, including guide tracks extending from the last to the first trimming stations and adapted to engage said rack members and hold them and their ham holders stationary while the hams are being removed from and mounted thereon.

18. The apparatus set forth in claim 17, wherein said tracks are adapted to move the racks as they approach the first trimming station and thereby rotate the ham holders to a position wherein one marginal edge of the fatty portion of the ham carried thereby is initially presented to the cutting tools at said first trimming station.

19. In apparatus for trimming fat from hams and the like, the combination comprising cutting mechanism adapted to move through the fat towards the lean portion underlying said fat and cut away a small segment of fat therefrom, electrically conductive probe means carried by said cutting mechanism and extending forwardly beyond the forwardmost cutting edge thereof, actuating means for providing relative reciprocating movement between said ham and said cutting mechanism towards and away from each other, and control means electrically wired to said actuating means and probe means and sensitive to the difference in conductivity between the fat and lean portions of the meat and adapted to cause said actuating means to reverse the movement of said cutting mechanism when said probe means make contact with the lean portion of the ham.

20. Apparatus for trimming fat from hams and the like comprising ham holding means, cutting mechanism adapted to move through the fat towards the lean portion underlying said fat and cut away a small segment of fat therefrom, means providing repeated relative reciprocating movement between the ham and the cutting mechanism towards and away from each other and automatically terminating and reversing the converging movement when the cutting mechanism has penetrated to within a predetermined distance of said lean portion whereby the cutting mechanism is substantially withdrawn from the fat and then reinserted and means providing relative lateral movement between said ham and cutting mechanism simultaneously with said reciprocating movement, said reciprocating and lateral movement being timed relative to each other whereby the cutting mechanism removes a series of adjacent overlapping segments of fat providing a continuous groove in the fat, the lean portion underlying said groove having a substantially uniform amount of fat remaining thereon throughout the length thereof.

21. Apparatus for trimming fat from hams and the like comprising means for holding and rotating a ham, a plurality of cutting mechanisms adapted for reciprocating movement into and out of said fat along a line generally perpendicular to the lean portion underlying the fat while said ham is rotating, said cutting mechanisms being arranged longitudinally of the axis of rotation of the ham so as to remove substantially parallel overlapping strips of fat from said ham, means for reversing the forward movement of said cutting mechanisms when they have penetrated to within a predetermined distance of said lean portion, the movements of said ham and cutting mechanisms being timed with relation to each other whereby each of said cutting mechanisms remove a series of overlapping segments of fat which form a continuous groove with the lean portion underlying said groove having a substantially uniform amount of fat remaining thereon throughout the length thereof, and means for alternately reversing the rotary motion of said holding means for moving the fatty portion of the ham back and forth past said cutting mechanisms, some of said cutting mechanisms being adapted to operate when said ham is rotating in one direction, the remaining cutting mechanisms being adapted to operate when said ham is rotating in the opposite direction.

22. Apparatus for trimming fat from hams and the like comprising means for holding and rotating a ham, a series of cutting stations each having at least one cutting mechanism located thereat, means for moving said ham holding and rotating means successively from station to station, means for reversing the direction of rotation at each succeeding station, said cutting mechanisms being adapted for reciprocating movement into and out of said fat along a line generally perpendicular to the lean portion underlying the fat while said ham is rotating, means for reversing the forward movement of said cutting mechanisms when they have penetrated to within a predetermined distance of said lean portion, the movements of said ham and cutting mechanisms being timed with relation to each other whereby each of said cutting mechanisms remove a series of overlapping segments of fat which form a continuous groove with the lean portion underlying said groove having a substantially uniform amount of fat remaining thereon throughout the length thereof, said cutting mechanisms being staggered with respect to each other longitudinally of the axis of rotation of said ham so as to remove parallel overlapping strips of fat therefrom.

23. The apparatus set forth in claim 22, wherein said ham rotating means rotates each ham through approximately 180° of movement at each station, and wherein the cutting mechanisms are adapted to begin their cutting at one side of the fatty portion and transverse substantially the entire width thereof.

24. The apparatus set forth in claim 22, including a plurality of ham holding and rotating means mounted on common supporting structure adapted to deliver said holding and rotating means successively to each of said cutting stations.

25. Apparatus for trimming fat from hams and the like comprising ham holding means adapted for movement along a predetermined path of travel, a series of cutting stations disposed along said path of travel, fat cutting means located at each of said stations, means for moving said holding means along said path of travel and thereby successively delivering said ham mounting means to each of said stations in said series, means for repeatedly reciprocating said cutting means into and out of the fat in a direction generally normal to the fat and the lean portion underlying the fat to thereby remove a small portion thereof during each fat penetrating movement, and means for moving said ham while at each station relative to said cutting means in a direction generally normal to the direction of reciprocating movement of said cutting means whereby said cutting means cuts out a series of overlapping portions providing a continuous groove in the fatty portion of the ham.

26. The apparatus set forth in claim 25, including means for positioning the ham at each station relative to the cutting means whereby said cutting means begins cutting adjacent one edge of the fatty portion and traverses substantially the entire width thereof as the result of said movement of the ham relative thereto, means for stopping movement of the ham when its fatty surface has been traversed by said cutting means and maintaining its position while being delivered to the next station whereby the other edge of said fatty portion is initially presented to the cutting means at said next station, and means for moving the ham at said next station in a direction reverse to its movement at the preceding station.

27. The apparatus set forth in claim 25, including probe means carried by said cutting means and extending forwardly thereof, and means for terminating the forward movement of said cutting means when said probe means make contact with said lean portion, whereby substantially the same amount of fat is left on the lean portion after each cutting.

28. Apparatus for trimming fat from hams and the like comprising a turntable, a circular series of circumferentially equally spaced rotatable ham holders mounted on said turntable, said turntable also carrying individual rotating mechanism engaged with each of said holders and capable of rotating the holders in either direction, a series of circumferentially equally spaced trimming stations concentrically disposed with respect to said holders and having the same angular displacement from each other as said holders, each of said stations having at least one cutting tool mounted thereon, simultaneously operating drive means mounted at each station for engaging and cooperating with said mechanism to rotate said hams relative to said cutters through a degree of movement corresponding to the peripheral expanse of the fatty portion of the hams, the drive means and rotating mechanism cooperating at alternate stations to reverse the direction of rotation of said holders from that at the preceding station, means for discontinuing the rotation of said holders after their hams have been rotated through said degree of movement, whereby they are delivered to the next station in the same position as when the rotational movement was terminated at the previous station, actuating means for repeatedly reciprocating said cutting tools into and out of the fatty portion of the ham at substantially right angles thereto while said ham is being rotated, probe means carried by said cutters and preceding same, means responsive to said probe means and interconnected with said actuating means for withdrawing said cutters when the probe makes contact with the lean portion underlying the fat, the rate of said reciprocation being timed with respect to said rate of rotation whereby said cutters remove a series of overlapping segments of fat and form a continuous groove therein leaving a uniform amount of fat remaining atop the lean, all of said cutters cooperating to remove parallel, overlapping strips, means for indexing said turntable to simultaneously deliver the holders to their next succeeding trimming stations, and means for positioning each holder at the first station so that the cutting tools thereat initially engage the leading marginal edge of the fatty portion with respect to the direction of rotational movement, succeeding tools being so positioned with respect to the hams delivered thereto as to also initially engage the leading marginal edge of the fatty portion relative to its respective direction of rotation.

29. Apparatus for removing fat from the face of hams and the like comprising a series of rotatable ham holders adapted for movement simultaneously in a circular path of travel, a series of trimming stations arranged concentrically with respect to said path of travel, each of said trimming stations having mounted thereat at least one cutting tool adapted to remove a continuous strip of fat from the face of a ham when it is rotated with respect thereto, means for indexing said holders along said path of travel to successively deliver them and the ham carried thereon to each of said series of trimming stations, and means for positioning and rotating each holder at each of said trimming stations through a distance which enables each cutting tool to remove a strip of fat from substantially the entire width of the fatty portion of each of said hams, the cutting tools provided by said series of trimming stations cooperating to remove adjacent overlapping strips of fat from the hams.

30. Apparatus for removing fat from the face of hams and the like comprising a turntable, a circular series of equi-spaced rotatable ham holders mounted on said turntable for simultaneous movement therewith about a common axis, a series of equi-spaced operational stations concentrically surrounding said series of holders and having the same angular degree of separation as said holders, said series of stations including a feeding station for mounting hams on empty holders, a series of trimming stations each having at least one cutting tool adapted to remove a continuous strip of fat from a ham when it is rotated relative thereto and a discharge station for removing the defatted hams, means for intermittently indexing said turntable to simultaneously move each holder to the next succeeding station and successively deliver each holder to each of said operational stations, means for independently and simultaneously rotating each of said holders positioned at a trimming station to enable each tool to remove a continuous strip of fat from the fatty portion of each of said hams, the tools provided by said series of trimming stations removing overlapping parallel strips of fat from substantially the entire fatty portion of said hams.

31. Defatting apparatus for hams and the like comprising a series of equi-spaced rotatable ham holders adapted for simultaneous movement along a common circular path of travel, a series of equi-spaced trimming stations concentrically arranged with respect to said path of travel and having the same angular displacement from each other as said holders, each of said trimming stations having at least one cutting tool mounted thereat adapted to penetrate the fat of said hams at substantially right angles to the surface of the lean meat underlying said fat and cut away a small portion of the fat during a single engagement therewith, means for simultaneously moving said holders along said common path of travel and successively delivering each holder to each of said trimming stations, drive means located at each of said trimming stations for disconnectably engaging and rotating each of the holders simultaneously relative to the cutting tools, means for reciprocating said tools along a fixed path of travel into and out of the fat of the hams as the hams are being rotated relative thereto whereby each tool removes a series of portions of fat providing a continuous groove from one side of the fatty portion to the other, the tools at all of said trimming stations cooperating to remove overlapping parallel strips of fat from substantially the entire surface area of the fatty portion of the ham, and means for automatically stopping the movement of the cutting tools towards the hams a predetermined distance from the lean meat underlying the fat, to permit each tool to remove a series of overlapping portions of fat providing a continuous groove from one side of the fatty portion to the other, the tools at all of said trimming stations cooperating to remove overlapping parallel strips of fat from substantially the entire surface area of the fatty portion of said ham.

32. Apparatus for trimming fat from hams and the like comprising a turntable, a plurality of ham holders mounted on said turntable and arranged in series circumferentially thereof for simultaneous movement along a common circular path of travel, a series of cutting stations disposed along said path of travel, cutting means mounted at each of said stations adapted to remove a different part of the fat on the hams, and means for rotating said turntable and thereby serially delivering the ham holders to successive stations, the combined cutting means cooperating to remove fat from substantially the entire surface thereof, said cutting means being adapted to move through the fat towards the lean portion underlying the fat, means for recording the border between the fat and the lean portion underlying the fat and adapted to signal when the cutting means moves to within a predetermined distance of said border, and means for stopping the movement of said cutting means towards the lean portion in response to said signal.

33. Apparatus for trimming fat from hams and the like comprising a series of equi-spaced rotatable ham holders adapted for simultaneous travel along a predetermined path of travel, a series of equi-spaced cutting tools mounted along said path of travel and arranged so as to oppose a corresponding number of holders simultaneously, said cutting tools being adapted to remove parallel continuous strips of fat from the hams carried by said holders when the hams are rotated relative thereto, means for rotating each of the holders opposed by a cutting tool simultaneously, means for bringing said cutting tools and the hams carried by said holders into fat removing engagement while said holders are being rotated, and means for successively indexing said series of holders and tools relative to each other along said path of travel to successfully deliver each holder to each of said series of cutting tools, said cutting tools being adapted to move through the fat towards the lean portion underlying the fat, means for recording the border between the fat and the lean portion underlying the fat and adapted to signal when the cutting tools move to within a predetermined distance of said border, and means for stopping the movement of said cutting tools towards the lean portion in response to said signal.

34. The apparatus set forth in claim 33, including means for rotating each holder relative to each succeeding tool of said series in a direction reverse to the direction of rotation relative to the preceding tool.

35. Apparatus for trimming fat from hams and the like comprising a rotatable ham holder adapted for movement along an endless predetermined path of travel, a series of trimming stations having fat cutting tools mounted thereat disposed along said path of travel, said tools being adapted to remove a continuous strip of fat from a ham held by said holder when said holder is rotated relative thereto, means for indexing said holder to successive stations of said series, individual drive means located at each station, actuating means engaged with each of said holders for rotating same and movable therewith along said path of travel, said actuating means disconnectably engaging each of said drive means at the respective stations, said actuating and drive means cooperating to rotate each holder and its ham at each station relative to the tools mounted thereat to cause said tools to remove strips of fat from said ham, and means for bringing said cutting tools and the hams carried by said holders into fat removing engagement while said holders are being rotated.

36. In apparatus for trimming fat from hams and the like, the combination comprising cutting mechanism adapted to move through the fat towards the lean portion underlying said fat and cut away a small segment of fat therefrom, probe means extending forwardly of and cooperatively interconnected with said cutting mechanism and capable of penetrating the fat and contacting the lean in advance of the cutting mechanism, and means for stopping the movement of the cutting mechanism towards the lean portion when the probe means contacts the lean.

37. Apparatus for trimming fat from hams and the like comprising means for holding and rotating a ham, cutting mechanism adapted for reciprocating movement into and out of said fat along a line generally perpendicular to the lean portion underlying the fat while said ham is rotating, means for effecting said movement and means for automatically reversing the forward movement of said cutting mechanism when it has penetrated to within a predetermined distance of said lean portion and before it has reached the border between the fat and lean, the movements of said ham and cutting mechanism being timed with relation to each other whereby said cutting mechanism removes a successive series of segments of fat which form a continuous groove with the lean portion underlying said groove having a substantially uniform amount of fat remaining thereon throughout the length thereof.

38. Apparatus for trimming fat from hams and the like comprising in combination means for holding and rotating a ham, a plurality of cutting elements disposed in series longitudinally of the axis of rotation and adapted for reciprocating movement into and out of the fat in a direction generally normal to the thickness dimension of the fat, means for effecting said movement while said ham is rotating, electrically conductive probe means movable simultaneously with and positioned ahead of said cutting elements and means for controlling the movements of said cutting elements, said last named means being in circuit with said probe means and responsive to the differences in electrical conductivity between the fat and the lean and adapted to reverse the forward movement of the cutting elements when the probe means engage the lean and responsive to said sensing means preventing further penetration of the cutting elements when the sensing means are in contact with the lean portion.

39. Apparatus for removing fat from ham and the like comprising ham mounting means, fat cutting means, means for mounting said cutting means opposite the fatty portion of said ham, actuating means providing relative reciprocating movement between said ham mounting means and said cutting means in a direction generally normal to the surface of the lean portion of the ham underlying said fatty portion, probe means extending forwardly of said cutting means in fixed relation thereto and capable of penetrating said fat and lean portions, and control means operatively connected to said actuating and probe means, said control means stopping the movement of the ham mounting means and cutting means toward one another in response to the probe means making contact with said lean portion.